Patented Dec. 25, 1951

2,579,515

UNITED STATES PATENT OFFICE 2,579,515

HALOHYDROXY ETHERS

John Robert Roach and Harold Wittcoff, Minneapolis, Minn., assignors to General Mills, Inc., a corporation of Delaware No Drawing. Application October 24, 1946,
Serial No. 705,485

6 Claims. (Cl. 260—615)

The present invention relates to halohydroxypropyl ethers which result from the addition of a hypohalous acid to compounds containing one or more allyl or substituted allyl ether groups. It relates further to the process of preparing these compounds.

Compounds of a high degree of functionality are desirable in many organic reactions. It has been found that it is possible to produce compounds of a high functionality by the addition of a hypohalous acid to compounds containing one or more allyl or substituted allyl ether groups. The resulting halohydroxypropyl ethers are useful as such, and are also useful as intermediates for the preparation of other valuable products. These are valuable by reason of their high functionality and their high reactivity. The halogen atoms enter readily into reaction with many types of compounds, such as alcohols, amines, ammonia, water and the like. The hydroxyl group on the other hand, enters into the reactions which are typical of an aliphatic alcohol grouping, such as etherification, esterification, dehydration, sulfonation, replacement by halogen, and the like.

It is, therefore, an object of this invention to provide novel compounds resulting from the addition of hypohalous acid to compounds contain one or more allyl ether groups or substituted allyl ether groups.

It is a further object of this invention to provide a process for producing these compounds.

The invention is broadly directed to the addition of a hypohalous acid to a compound containing an allyl ether or substituted allyl ether group. The hypohalous acids used include hypochlorous, hypobromous, and hypoiodous acids. The addition of the hypohalous acid may be effected according to any of a number of procedures; usually a dilute solution of hypohalous acid in water is reacted with unsaturated ether at a temperature below room temperature. The hypohalous acid may be prepared separately from the addition reaction mixture, or it may be prepared in situ. Hypochlorous acid, for example, may be prepared by the reaction of chlorine on mercuric oxide. The mercuric hypochlorite which is formed is then decomposed with nitric acid to yield hypochlorous acid. The allyl ether may then be added to this hypochlorous acid. It is also possible, for example, to mix the allyl ether in dilute aqueous medium with an alkaline earth hypochlorite such as calcium hypochlorite, and thereafter acidify the reaction mixture by means of gaseous carbon dioxide to precipitate calcium carbonate and to liberate hypochlorous acid which then is added to the unsaturated allyl ether.

Hypochlorous acid may also be prepared by the reaction of chlorine on sodium carbonate or bicarbonate in dilute aqueous solution. Hypobromous and hypoiodous acids may likewise be prepared by the action of bromine or iodine on mercuric oxide. It will be apparent, however, that any procedure of hypohalogenation may be employed.

After the addition has been effected, the product may be extracted from the aqueous medium with ether or, as an alternative, the water may be removed by evaporation to leave the halohydroxypropyl ether as a residue. This latter procedure is particularly applicable in the case where the hypohalous acid is generated from calcium hypohalite and carbon dioxide, since in that case, the calcium carbonate is insoluble and can be removed. The resulting aqueous reaction mixture then no longer contains inorganic salts in solution which would tend to contaminate a product obtained by evaporation of water.

The addition product may be any of a variety of compounds depending upon the allyl ether used as a starting material. Thus in a simple case, from diallyl ether and hypochlorous acid, there is obtained a bis-(chlorohydroxy)-propyl ether which is obtained as a clear water-white stable compound. From monoallylglycerol there results a monochlorohydroxypropyl ether of glycerol; from diallylglycerol, there is obtained a bis-(chlorohydroxypropyl) ether of glycerol; triallylglycerol produces a tris-(chlorohydroxypropyl) ether of glycerol; from tetraallylpentaerythritol, a tetrakis-(chlorohydroxypropyl) ether of pentaerythritol is obtained; while from octaallylsucrose there is obtained a derivative with eight chlorohydroxypropyl ether groups. Moreover with these higher allyl ethers, it is possible to limit the amount of hypohalous acids such that the resultant product contains some halohydroxypropyl ether groups and may still contain some allyl groups. The above mentioned allyl ethers are only representative of those which may be employed. The allyl ether or substituted allyl ether of any di- or polyhydroxy material may be used, such as ethyleneglycol, erythritol, xylitol, sorbitol, glucose, mannose; 2,2,6,6 - tetramethylolcyclohexanol, 3,3,5,5-tetramethylolpyran-4-ol, and other condensation products of aldehydes and ketones with formaldehyde; tris - (hydroxymethyl) - aminomethane, diethanolamine, dihydroxystearic acid, and the like. In addition, there may be employed the allyl ethers or substituted allyl ethers of the polysaccharides, such as starch, cellulose, and the like. It is apparent, therefore, that any degree of functionality may be obtained merely by the choice of the unsaturated starting material.

The following examples will serve to illustrate the invention:

*Example 1*

A solution of hypochlorous acid was prepared by passing chlorine into a mixture of mercuric oxide and ice at 0–5° C. When the mercuric oxide had dissolved, dilute nitric acid was added. Sufficient water was used in the preparation so that the concentration of hypochlorous acid, as indicated by titration, was 3.16%. To one liter of this solution was added one mole of diallyl ether at 15–20° C. When a test sample no longer gave a yellow color with acidified potassium iodide, more hypochlorous acid solution was added until slightly more than the theoretical had been employed. The reaction mixture was then saturated with sodium sulfate and extracted with ether. The ether solution was dried over sodium sulfate and concentrated to obtain a product which distilled at 145–158° C. at 1 mm. and which possessed a chlorine content of 35.1% as compared to the theoretical value of 34.9%. The boiling point was then determined accurately on a twice-distilled sample as 138–139° C. at 1 mm.

*Example 2*

A suspension of 102 parts of 35% calcium hypochlorite in 2500 parts of water was treated with 24.5 parts of diallyl ether. The mixture was stirred at 5° C. or less, and carbon dioxide was passed in. After two hours, all of the calcium hypochlorite had been used up, as indicated by titration. Accordingly, 51 parts more were added. After a total reaction time of three and three-quarter hours, the reaction mixture was filtered, and the filtrate was saturated with sodium chloride and extracted with ether, after which the product was isolated and distilled as indicated in the preceding example.

*Example 3*

To a suspension of 102 parts of 35% calcium hypochlorite in 2500 parts of water was added 43 parts of diallylglycerol. Thereafter carbon dioxide was passed in with vigorous stirring at a temperature of 4° C. or less. At the end of one hour, all the calcium hypochlorite had been used up as indicated by titration. Accordingly, 51 parts more were added, and the reaction was allowed to proceed for one hour more. The aqueous mixture was saturated with sodium chloride and extracted with ether in a continuous extraction apparatus to obtain, after removal of the ether, a product which could be distilled only with difficulty. The chlorine content of the crude material, however, indicated that it was chiefly the bis-(chlorohydroxypropyl) ether of glycerol.

While various modifications of the invention have been described, it is to be understood that the same is not limited thereto, but may be varied within the scope of the following claims.

We claim as our invention:

1. Process of producing a chlorohydroxypropyl ether of a polyhydric alcohol which comprises mixing a compound selected from the group consisting of diallyl ether and allyl ethers of polyhydric alcohols, in dilute aqueous media with an alkaline earth metal hypochlorite, thereafter acidifying the reaction mixture by means of carbon dioxide to precipitate alkaline earth metal carbonate and to liberate hypochlorous acid, maintaining the reaction mixture at a temperature between 0° C. and room temperature until the hypochlorous acid is consumed, removing the precipitated alkaline earth metal carbonate, and recovering the chlorohydroxypropyl ether.

2. Process of producing a chlorohydroxypropyl ether of a polyhydric alcohol which comprises mixing a compound selected from the group consisting of diallyl ether and allyl ethers of polyhydric alcohols, in dilute aqueous media with an alkaline earth metal hypochlorite, thereafter acidifying the reaction mixture by means of carbon dioxide to precipitate alkaline earth metal carbonate and to liberate hypochlorous acid, maintaining the reaction mixture at a temperature between 0° C. and room temperature until the hypochlorous acid is consumed, removing the precipitated alkaline earth metal carbonate, removing water from the aqueous solution to recover the chlorohydroxypropyl ether.

3. Process of producing a chlorohydroxypropyl ether of a polyhydric alcohol which comprises mixing a compound selected from the group consisting of diallyl ether and allyl ethers of polyhydric alcohols, in dilute aqueous media with an alkaline earth metal hypochlorite, thereafter acidifying the reaction mixture by means of carbon dioxide to precipitate alkaline earth metal carbonate and to liberate hypochlorous acid, maintaining the reaction mixture at a temperature between 0° C. and room temperature until the hypochlorous acid is consumed, removing the precipitated alkaline earth metal carbonate, extracting the aqueous solution with an organic solvent for the chlorohydroxypropyl ether, and recovering the chlorohydroxypropyl ether from the resultant extract.

4. Process of producing the dichlorhydrin of diglycerol which comprises mixing diallyl ether in dilute aqueous media with an alkaline earth metal hypochlorite, thereafter acidifying the reaction mixture by means of carbon dioxide to precipitate alkaline earth metal carbonate and to liberate hypochlorous acid, maintaining the reaction mixture at a temperature between 0° C. and room temperature until the hypochlorous acid is consumed, removing the precipitated alkaline earth metal carbonate, and recovering the dichlorhydrin of diglycerol.

5. Process of producing the monochlorhydrin of diglycerol which comprises mixing monoallylglycerol in dilute aqueous media with an alkaline earth metal hypochlorite, thereafter acidifying the reaction mixture by means of carbon dioxide to precipitate alkaline earth metal carbonate and to liberate hypochlorous acid, maintaining the reaction mixture at a temperature between 0° C. and room temperature until the hypochlorous acid is consumed, removing the precipitated alkaline earth metal carbonate, and recovering the monochlorhydrin of diglycerol.

6. Process of producing the di-(chlorohydroxypropyl)-ether of glycerol which comprises mixing diallylglycerol in dilute aqueous media with an alkaline earth metal hypochlorite, thereafter acidifying the reaction mixture by means of carbon dioxide to precipitate alkaline earth metal carbonate and to liberate hypochlorous acid, maintaining the reaction mixture at a temperature between 0° C. and room temperature until the hypochlorous acid is consumed, removing the precipitated alkaline earth metal carbonate, and recovering the di-(chlorohydroxypropyl)-ether of glycerol.

JOHN ROBERT ROACH.
HAROLD WITTCOFF.

REFERENCES CITED

The following references are of record in the file of this patent:

UNITED STATES PATENTS

| Number | Name | Date |
|---|---|---|
| 1,308,796 | McElroy | July 8, 1919 |
| 1,496,675 | Irving et al. | June 3, 1924 |
| 2,161,937 | Scott | June 13, 1939 |
| 2,380,185 | Marple | July 10, 1945 |

FOREIGN PATENTS

| Number | Country | Date |
|---|---|---|
| 317,770 | Great Britain | Aug. 19, 1929 |

OTHER REFERENCES

Wislicenus: Ann. du chemie, 192, 106–113 (1878).